United States Patent [19]
Melnikov et al.

[11] 3,923,493
[45] Dec. 2, 1975

[54] HERBICIDE

[76] Inventors: Nikolai Nikolaevich Melnikov, ulitsa Dm. Ulyanova, 4, korpus A, kv. 96; Artur Felixovich Grapov, Davydkovskaya ulitsa, 10, kv. 106; Tamara Fedorovna Kozlova, Kolomensky proezd, 1, korpus 8, kv. 75, all of Moscow; Galina Borisovna Shakhova, Proletarskaya ulitsa, 8, kv. 20; Valery Pavlovich Pokatun, Tsentralnaya ulitsa 39/7, kv. 11, both of Schelkovo Moskovskoi oblasti; Leonid Dmitrievich Stonov, Lavrushensky pereulok, 17, kv. 21; Ljudmila Alexandrovna Bakumenko, ulitsa Gorkogo, 54, kv. 86, both of Moscow; Tatyana Akimovna Sergeeva, ulitsa Likhacheva 11; Lidia Mikhailovna Titova, ulitsa Likhacheva 19, all of Dolgoprudny Moskovskoi oblasti, all of U.S.S.R.

[22] Filed: Jan. 6, 1972

[21] Appl. No.: 215,913

[52] U.S. Cl. .................. 71/87; 260/954; 260/959
[51] Int. Cl.² ................................. A01N 9/36
[58] Field of Search ............................. 71/87

[56] References Cited
UNITED STATES PATENTS
3,644,600  1/1972  Beriger ........................... 71/87
3,652,737  3/1972  Gutman .......................... 71/87
3,705,929  12/1972 Schrader et al. ............... 71/87
3,819,754  6/1974  Aya et al. ....................... 71/87

*Primary Examiner*—James O. Thomas, Jr.
*Attorney, Agent, or Firm*—Haseltine, Lake & Waters

[57] ABSTRACT

Herbicidal substituded amido esters of thiophosphonic acid having the general formula

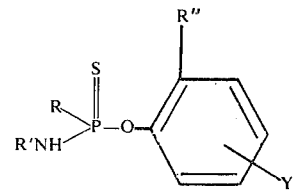

wherein
R is chlorine-substituted $C_1$-$C_2$ alkyl;
R' is straight-chain or branched $C_1$-$C_4$ alkyl;
R'' is hydrogen, methyl, chloro, or nitro group;
Y is a nitro, hydrogen, chlorine, or methyl, provided that
R'' is not identical with Y and that, when R'' or Y is hydrogen, Y or R'' can not be chlorine or methyl.

2 Claims, No Drawings

HERBICIDE

This invention relates to the use, as herbicides, of substituted amido esters of alkyl haloalkyl thiophosphonic acids having the general formula

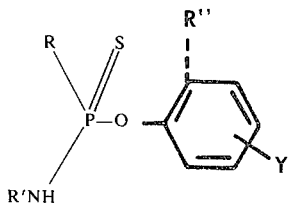

where

R is an alkyl having 1 to 4 carbon atoms or a haloalkyl;

R' is an n- or iso alkyl having 1 to 4 carbon atoms;

R'' is hydrogen, alkyl or a halo group;

Y is a halo or a nitro group, wherein Y and R'' cannot be a halo simultaneously.

In accordance with the invention, the compounds having the above formula, can be used as selective herbicides to control weeds in agriculture, in particular to fight millet-like weeds in cereals, for example rice and barley. Propanyl (3,4-dichloroanimide propionate) and molinate (S-ethyl hexamethyleneiminothiolcarbamate), and also isophos (0-2,4-dichlorophenyl-N-isopropylamidochloromethyl thiophosphonate) (Inventor's Certificate of the USSR No. 216380) are used at the present time to control millet-like weeds.

Propanyl is used in the form of a dispersion sprinkled over green plants having 1–3 leaves, the consumption rate of the herbicide being 5–9 kg/hectare. The disadvantage of propanyl is the short period of time during which it can be used and hence the possibility of reinfection of the culture with the weeds at later stages of the plant growth.

Molinate and isophos are pre-emergence herbicides; i.e., preparations that are introduced into the soil before seeding the crops, the dosage being 4–6 kg/hectare. These preparations ensure high efficacy against the millet-like weeds and increase the yields of cereals.

The preferred preparations of this invention, those of, for example, 0-2-chloro-4-methylphenyl-N-secondary butylamidochloromethyl thiophosphonate, are more efficaceous, more durable and have a wider spectrum of action compared with the known herbicide 0-2,4-dichlorophenyl-N-isopropylamidochloromethyl thiophosphonate (isophos).

Herbicides according to the present invention can be used for combating weeds in the form of emulsifying concentrates, dusts, wettable powders, and granules.

The preparations can be applied either before germination or after the plants have already emerged from the soil. The toxicity of the herbicides with respect to man and warm-blooded animals is moderate.

According to the invention, 0-2-chloro-4-methylphenyl-N-secondary amidochloromethyl thiophosphonate is the most preferred and most active herbicide.

The synthesis of the herbicides of this invention, i.e., the amides of 0-arylalkyl (halo alkyl) thiophosphonates can be effected directly from the dichloroanhydride of alkyl (halo alkyl) thiophosphonate by subsequent treatment with a mixture of one mole of the primary and the secondary amine and one mole of the tertiary amine and finally with a solution of a substituted phenol in an inert solvent at a temperature from −20 to +10°C (method 1), similar to the procedure described in the Inventor's Certificate of the USSR No. 228,684.

The said herbicides can be obtained also by the interaction between chloroanhydride of 0-aryl-alkyl- (haloid alkyl) thiophosphonate and the amine (method II). (Inventor's Certificate of the USSR No. 189,852, 1968).

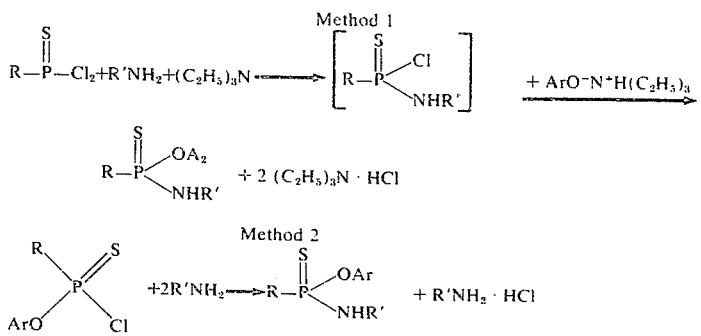

Empirical analytical data of the most active herbicides synthesized by the above methods are given in Table 1. For a better understanding of the invention, reference may be had to the following examples, wherein the herbicides of this invention were applied under laboratory and hot-house conditions.

EXAMPLE 1

The herbicidal action of the weed-killers was tested in a laboratory according to the standard procedure. The test plants were grown on agar-agar in Petri dishes. The preparations were introduced into the agar in the form of an aqueous emulsion. The results of the test are given in Table 2.

EXAMPLE 2

The herbicidal activity of the weed-killers was tested on wheats, millets, rice, oats, radish, beans, cotton, tomatoes, cucumbers, cabbage, carrots, soya, wild oats, saltbush, barnyard grass.

The herbicidal activity of the weed-killer was assessed on a five-grade principle:

0 - no affect

1 - very slight affect

2 - weak inhibition of plant growth (the growth is arrested, yellow spots develop, 10–20 percent loss in weight of green plants 3 - marked inhibition of plant growth (30–50 percent of plants wither)

4 - strong inhibition of plants (60–80 percent of plants perish);

5 - very strong inhibition of plant growth (90–100 percent of plants perish).

The results of the experiments are given in Table 3.

EXAMPLE 3

0-2-chloro-4-methylphenyl-N-secondary butylamidochloromethyl thiophosphonate was tested as a herbicide on rice and weeds of Echinochloa species under hot-house conditions. The preparation was introduced into the soil before seeding. The preparation did not produce harmful effect on the rice and completely eradicated the weeds.

The results of the test are given in Table 4.

Table I

| Nos | Compound | Method of preparation | Yield % | B.p.°C or m.p.°C | $N_D^{25}$ | $d_4^{25}$ |
|---|---|---|---|---|---|---|
| 1 | 2 | 3 | 4 | 5 | 6 | 7 |
| 1. | O-2-nitrophenyl-N-secondary butylamidochloromethyl thiophosphonate | I | 50 | 42–43 | — | — |
| 2. | O-4-nitrophenyl-N-isopropylamidochloromethyl thiophosphonate | I | 73.4 | 182/0.2 | 1.5830 | 1.3358 |
| 3. | O-2-nitro-6-methylphenyl-N-secondary butylamidochloromethyl thiophosphonate | I | 68.8 | 45–46 | — | — |
| 4. | O-2-nitro-6-methylphenyl-N-secondary butylamidochloromethyl thiophosphonate | I | 60 | 72–73 | — | — |
| 5. | O-2-chloro-4-nitrophenyl-N-isopropylamidochloromethyl thiophosphonate | I | 63.5 | 174/0.19 | 1.5816 | 1.3891 |
| 6. | O-2-chloro-4-chlorophenyl-N-secondary butylamidochloromethyl thiophosphonate | I | 76 | 163–164/0.17 | 1.5749 | 1.3607 |
| 7. | O-2-nitro-4-methylphenyl-N-secondary butylamidochloromethyl thiophosphonate | I | 55 | 173–175/0.25 | 1.5660 | 1.3621 |
| 8. | O-2-chloro-4-methylphenyl-N-secondary butylamidochloromethyl thiophosphonate | I | 66 | 147/0.17 | 1.5558 | 1.2310 |
| 9. | O-2-methyl-4-chlorophenyl-N-isopropylamidochloromethyl thiophosphonate | I | 70.2 | 137–138/0.12 | 1.5619 | 1.2220 |
| 10. | O-2-chloro-4-methylphenyl-N-methylamidochloromethyl thiophosphonate | II | 85.7 | 51.5–53 | — | — |

| Found, % | | | | Empirical formula | Calculated, % | | | |
|---|---|---|---|---|---|---|---|---|
| N | Cl | P | S | | N | Cl | P | S |
| 8 | 9 | 10 | 11 | 12 | 13 | 14 | 15 | 16 |
| 8.54 | — | 0.87 | — | $C_{11}H_{16}ClN_2O_3PS$ | 8.68 | — | 9.60 | — |
| 8.60 | | 9.58 | | | | | | |
| 9.16 | — | — | 10.59 | $C_{10}H_{14}ClN_2O_3PS$ | 9.07 | — | — | 10.39 |
| 9.21 | | | 10.75 | | | | | |
| 8.66 | — | — | 10.02 | $C_{11}H_{16}ClN_2O_3PS$ | 8.68 | — | — | 9.94 |
| 8.69 | | | 10.05 | | | | | |
| 8.60 | — | 9.22 | — | $C_{12}H_{18}ClN_2O_3PS$ | 8.32 | — | 9.20 | — |
| 8.58 | | 9.50 | | | | | | |
| 8.16 | — | — | 9.32 | $C_{10}H_{13}Cl_2N_2O_3PS$ | 8.16 | — | — | 9.63 |
| 8.36 | | | 9.51 | | | | | |
| 7.74 | 19.88 | — | — | $C_{11}H_{15}Cl_2N_2O_3PS$ | 7.84 | 19.85 | — | — |
| 7.92 | 19.92 | | | | | | | |
| 8.60 | — | 9.05 | — | $C_{12}H_{18}ClN_2O_3PS$ | 8.32 | — | 9.20 | — |
| 8.55 | | 8.82 | | | | | | |
| 4.44 | 21.60 | — | 9.68 | $C_{12}H_{18}Cl_2NOPS$ | 4.29 | 21.74 | — | 9.83 |
| 4.59 | 21.84 | | 9.55 | | | | | |
| 4.60 | 22.91 | — | — | $C_{11}H_{18}Cl_2NOPS$ | 4.49 | 22.71 | — | — |
| 4.59 | 23.19 | | | | | | | |
| 4.51 | 25.14 | 11.00 | — | $C_9H_{12}Cl_2NOPS$ | 4.43 | 24.96 | 10.90 | — |
| 4.48 | 24.97 | 11.23 | | | | | | |

| 1 | 2 | 3 | 4 | 5 | 6 | 7 |
|---|---|---|---|---|---|---|
| 11. | O-2-chloro-4-methylphenyl-N-dimethylamidochloromethyl thiophosphonate | II | 90.3 | 138–139/0.15 | 1.5742 | 1.3179 |
| 12. | O-2-chloro-4-methylphenyl-N-ethylamidochloromethyl thiophosphonate | II | 84.6 | 141/0.16 | 1.5723 | 1.2994 |
| 13. | O-2-chloro-4-methylphe- | II | 83.5 | 132– | 1.5642 | 1.2638 |

-continued

| 1 | 2 | 3 | 4 | 5 | 6 | 7 |
|---|---|---|---|---|---|---|
|   | nyl-N-propylamidochloromethyl thiophosphonate |   |   | 133/0.13 |   |   |
| 14. | O-2-chloro-4-methylphenyl-N-isopropylamidochloromethyl thiophosphonate | 11 | 85.9 | 129/0.17 | 1.5588 | 1.2455 |
| 15. | O-2-chloro-4-methylphenyl-N-butylamidochloromethyl thiophosphonate | 11 | 82.9 | 149.5–150/0.18 | 1.5570 | 1.2223 |
| 16. | O-2-chloro-4-methylphenyl-N-isobutylamidochloromethyl thiophosphonate | 11 | 95 | 146–147/0.2 | 1.5574 | 1.2302 |
| 17. | O-2-chloro-4-methylphenyl-N-secondary butylamido-$\beta$-chloroethyl thiophosphonate | 11 | 77.6 | 152–153/0.12 | 1.5550 | 1.1981 |
| 18. | O-2-chloro-4-methylphenyl-N-isopropylamidomethyl thiophosphonate | 11 | 84.5 | 124–125/0.17 | 1.5556 | 1.1878 |
| 19. | O-2-chloro-4-methylphenyl-N-secondary butylamidomethyl thiophosphonate | 11 | 79.5 | 125–126/0.12 | 1.5493 | 1.1789 |
| 20. | O-2-chloro-4-methyl-N-isopropylamido-$\beta$-chloroethyl thiophosphonate | 11 | 67.5 | 147/0.18 | 1.5590 | 1.2360 |

| 8 | 9 | 10 | 11 | 12 | 13 | 14 | 15 | 16 |
|---|---|---|---|---|---|---|---|---|
| 4.35 / 4.17 | — | 10.61 / 10.44 | — | $C_{10}H_{14}Cl_2NOPS$ | 4.70 | — | 10.39 | — |
| 5.09 / 5.13 | 23.35 | 10.97 / 11.16 | — | $C_{10}H_{14}Cl_2NOPS$ | 4.70 | 23.78 | 10.39 | — |
| 4.38 / 4.42 | — | — | — | $C_{11}H_{16}Cl_2NOPS$ | 4.48 | — | — | — |
| 4.00 / 4.08 | — | 9.00 / 9.31 | — | $C_{11}H_{16}Cl_2NOPS$ | 4.48 | — | 9.92 | — |
| 4.16 / 4.28 | — | 9.55 | — | $C_{12}H_{18}Cl_2NOPS$ | 4.29 | — | 9.49 | — |
| 4.22 / 4.27 | — | 9.72 / 10.07 | — | $C_{12}H_{18}Cl_2NOPS$ | 4.29 | — | 9.49 | — |
| 3.68 / 3.71 | — | 9.14 / 8.87 | 9.53 / 9.80 | $C_{13}H_{20}Cl_2NOPS$ | 4.11 | — | 9.10 | 9.42 |
| 5.09 / 5.02 | — | 11.76 / 11.45 | — | $C_{11}H_{17}ClNOPS$ | 5.04 | — | 11.15 | — |
| 4.96 / 4.71 | — | — | 10.68 / 10.64 | $C_{12}H_{19}ClNOPS$ | 4.80 | — | — | 10.99 |
| 4.04 / 4.25 | — | 9.28 / 8.91 | — | $C_{12}H_{13}ClNOPS$ | 4.29 | — | 9.49 | — |

Table 2

| Nos | Compound | \multicolumn{8}{c}{Dose (in kg/hectare) producing 50 per cent inhibition} |
|---|---|---|---|---|---|---|---|---|---|
|  |  | wheat | | oats | | millet | | radish | |
|  |  | shoots | roots | shoots | roots | shoots | roots | shoots | roots |
| 1 | 2 | 3 | 4 | 5 | 6 | 7 | 8 | 9 | 10 |
| 1. | O-4-nitrophenyl-N-secondary butylamidomethyl thiophosphonate | >1 | 1 | >1 | 0.7 | >1 | >1 | 0.9 | 0.5 |
| 2. | O-2-chloro-4-methylphenyl-N-isopropylamidomethyl thiophosphonate | >1 | 0.6 | >1 | 0.5 | 0.6 | >1 | 0.9 | 0.5 |
| 3. | O-2-chloro-4-methylphenyl-N-propylamidochloromethyl thiophosphonate | >1 | >1 | 0.09 | 0.04 | 0.09 | 0.5 | >5 | >5 |
| 4. | O-2-chloro-4-methylphenyl-N-isopropylamidochloromethyl thiophosphonate | 0.7 | 0.3 | 0.09 | 0.04 | 0.04 | 0.3 | >5 | >5 |
| 5. | O-2-chloro-4-methylphenyl-N-butylamidochloromethyl thiophosphonate | >1 | >1 | 0.9 | 0.08 | 0.8 | >1 | >5 | >5 |
| 6. | O-2-chloro-4-methylphenyl-N-secondary butylamidochloromethyl thiophosphonate | 0.4 | 0.7 | 0.05 | 0.01 | 0.02 | 0.07 | >5 | >5 |
| 7. | O-2-chloro-4-methylphenyl-N-isobutylamidochloromethyl thiophosphonate | >1 | >1 | 0.7 | 0.08 | 0.2 | 0.5 | >5 | >5 |
| 8. | O-2-chloro-4-methylphenyl-N-isopropylamido-$\beta$-chloroethyl thiophosphonate | >1 | 0.6 | 0.5 | 0.05 | 0.7 | 0.5 | >1 | >1 |
| 9. | O-2-chloro-4-methylphenyl-N-secondary butylamido-$\beta$-chloroethyl thiophosphonate | >1 | 0.7 | 0.1 | 0.05 | 0.1 | 0.2 | >1 | >1 |

Table 2-continued

| Nos | Compound | Dose (in kg/hectare) producing 50 per cent inhibition | | | | | | | |
|---|---|---|---|---|---|---|---|---|---|
| | | wheat | | oats | | millet | | radish | |
| | | shoots | roots | shoots | roots | shoots | roots | shoots | roots |
| 1 | 2 | 3 | 4 | 5 | 6 | 7 | 8 | 9 | 10 |
| 10. | O-2-nitrophenyl-N-secondary butylamidochloromethyl thiophosphonate | 6.5 | 2 | 8 | 1 | 3 | 1 | >10 | >10 |
| 11. | O-2-nitro-4-methylphenyl-secondary butylamidochloromethyl thiophosphonate | 7.5 | 1.5 | 3.5 | 1 | 2 | 1 | >10 | 9.5 |
| 12. | O-2-nitro-6-methylphenyl-N-secondary butylamidochloromethyl thiophosphonate | >10 | 3 | 8 | 1 | 4 | 1 | >10 | >10 |
| 13. | O-2-nitro-4-chlorophenyl-N-secondary butylamidochloromethyl thiophosphonate | >1 | 0.007 | 0.8 | 0.005 | 0.35 | 0.008 | >1 | >1 |
| 14. | O-2-chloro-4-nitrophenyl-N-isopropylamidochloromethyl thiophosphonate | >1 | 0.008 | >1 | 0.005 | >1 | 0.4 | >1 | >1 |
| 15. | O-2-chloro-4-nitrophenyl-N-secondary butylamidochloromethyl thiophosphonate | >1 | 0.008 | >1 | 0.005 | >1 | 0.3 | >1 | >1 |
| 16. | O-2-methyl-4-chlorophenyl-N-isopropylamidochloromethyl thiophosphonate | >1 | >1 | >1 | >1 | 1 | 1 | 8.5 | 1 |
| 17. | O-2-methyl-4-chlorophenyl-N-isopropylamidochloromethyl thiophosphonate | >1 | >1 | >1 | >1 | >1 | >1 | >1 | >1 |

Table 3

| Nos | Preparation | Culture | Wheat | Oats | Millet | Rice | Radish | Bean | Cotton | Tomato |
|---|---|---|---|---|---|---|---|---|---|---|
| 1. | O-2-nitro-4-chlorophenyl-N-secondary butylamidochloromethyl thiophosphonate | 0 | 0 | 0 | 0 | 0 | 0 | 0 | 0 | 0 |
| 2. | O-2-chloro-4-nitrophenyl-N-isopropylamidochloromethyl thiophosphonate | 0 | 0 | 0 | 0 | 0 | 0 | 0 | 0 | 0 |
| 3. | O-2-chloro-4-methylphenyl-N-isopropylamidochloromethyl thiophosphonate | 0 | 0 | 0 | 0 | 0 | 0 | 0 | 0 | 0 |
| 4. | O-2-chloro-4-methylphenyl-N-secondary butylamidochloromethyl thiophosphonate | 0 | 2 | 3 | — | 0 | 2 | 0 | 0 | 3 |

| Cucumbers | Barnyard grass | Wild oats | Saltbush | Cabbage | Carrots | Soya |
|---|---|---|---|---|---|---|
| 0 | 4 | 0 | 0 | — | — | — |
| 0 | 1 | 0 | 0 | — | — | — |
| 0 | 4 | 0 | 0 | — | — | — |
| 0–1 | 5 | — | — | 1 | 1 | 0 |

Table 4

| Nos | Compound | Dose in kg/ha | Herbicidal activity (5-degree scale) | |
|---|---|---|---|---|
| | | | rice | millet rice |
| 1. | O-2-chloro-4-methylphenyl-N-secondary butylamidochloromethyl thiophosphonate | 2 | 0 | 5 |
| | | 4 | 0 | 5 |
| | | 6 | 0 | 5 |
| 2. | Controls | | 0 | 0 |

We claim:

1. A herbicidal composition comprising as an active ingredient an effective amount of the compound 0-(2-chloro-4-methylphenyl)-N-sec.-butylamido chloromethylthiophos 2. A method of controlling weeds comprising applying to said weeds an effective amount of a herbicidal composition comprising as an active ingredient the compound 0-(2-chloro-4-methylphenyl)-N-sec.-butylamido-chloromethylthiophosphonate.

* * * * *